Jan. 6, 1970 W. F. BRECHT, JR 3,487,647
BUOYANCY CONTROL FOR SCUBA DIVING
Filed Sept. 18, 1967 9 Sheets-Sheet 1

INVENTOR.
William F. Brecht, Jr.
BY
Jackson, Jackson, & Chavanes
ATTORNEYS

Fig. 2

INVENTOR.
William F. Brecht, Jr.
BY
Jackson, Jackson, & Chovanes
ATTORNEYS

United States Patent Office 3,487,647
Patented Jan. 6, 1970

3,487,647
BUOYANCY CONTROL FOR SCUBA DIVING
William F. Brecht, Jr., 141 E. Atlantic Ave.,
Audubon, N.J. 08106
Filed Sept. 18, 1967, Ser. No. 668,394
Int. Cl. B63c 11/08; B63g 8/22
U.S. Cl. 61—69
8 Claims

ABSTRACT OF THE DISCLOSURE

A device which utilizes air from an underwater scuba diver's breathing air supply to optionally, and under the control of the diver, permit the diver to ascend, descend, or remain in a weightless state at a given water depth selected by the diver.

Air is selectively and automatically fed to and released from, displacement chambers to achieve a desired buoyancy.

---

The present invention relates to devices for controlling the buoyancy of scuba divers and more particularly to an apparatus which propels a diver upwardly or downwardly, or permits him to attain a state of weightlessness.

A purpose of this invention is to permit a diver to maneuver in a body of water in a state of weightlessness at any selected depth.

A further purpose of the invention is to provide an apparatus which enables a diver to remain in a state of weightlessness at any depth in a body of water, wherein the apparatus automatically compensates for the decrease in buoyancy which the diver encounters as he descends.

A further purpose of the invention is to eliminate the need for a diver to calculate an amount of lead weight which he would need to apply to obtain a state of weightlessness at a given predetermined depth.

A further purpose of the invention is to enable a diver to obtain complete control of his buoyancy, either negative, positive or zero, at any time.

A further purpose of the invention is to permit a diver to control his buoyancy by means of air from his main scuba breathing air supply, in the form of either a supply tank or a surface air pump connected to his hooka attachment on his regulator.

A further purpose of the invention is to enable a diver to quickly and accurately, without any computation on his part, compensate for his weight variations under water.

A further purpose of the invention is to permit a diver to automatically achieve or acquire negative or positive buoyancy from the device of the invention, to compensate for variations in the buoyancy contributed from the main scuba diving equipment.

A further purpose of the invention is to enable a diver automatically, and without mental calculation or other computation, compensate for the variation in buoyancy caused by the consumption of air from the main scuba air supply tank.

A further purpose is to provide a safe and foolproof buoyancy device which may be used in any position or posture attained by the diver in his underwater activity.

A further purpose is to provide a buoyancy apparatus which works in an identical manner regardless of the posture or the position of the device.

A further purpose is to permit a diver wearing scuba equipment to stop at any depth underwater and maintain that level automatically, wherein he will have a state of weightlessness or buoyancy of zero at the depth that he chooses.

A further purpose is to utilize a water depth to set a buoyancy level.

A further purpose is to permit a diver to maintain a set level of buoyancy automatically which will compensate for the variations in weight of the diver including variations caused by handling of underwater tools, equipment and the like.

A further purpose is to permit a diver to maintain a buoyancy, and to set his level of buoyancy, to provide a state of weightlessness at a given water depth, to provide for decompressions stops.

A further purpose is to eliminate the need for a diver swimming at a certain level to maintain his position at that level to provide a decompression stop.

A further purpose is to eliminate the need for a diver securing himself to an anchor line or the like at a given level to provide for a decompression stop.

A further purpose is to permit a diver to set a buoyancy automatically at a given level to achieve a state of weightlessness at that level, to enable the diver to do any one of a number of activities such as work, underwater photography, swimming or the like, at one set level.

A further purpose is to permit any underwater activity, including military operations, to be carried out under darkness, at a given water depth, without visible depth indications, such as the water bottom, or surface light.

A further purpose is to automatically compensate for the loss of buoyancy which results from increased water pressure on the human body encountered at increased depth.

A further purpose is to utilize a controllable buoyancy effect, with use of air from the main supply tank, to achieve vertical propulsion either upwardly or downwardly.

A further purpose is to utilize air from the main supply tank to provide additional positive buoyancy for lifting outside objectives in underwater operations.

A further purpose is to utilize all the diver's energy in swimming horizontally, and eliminate energy expenditure by the diver to maintain a desired depth level.

Further purposes appear in the specification and in the claims.

FIGURE 7 is a right sectional elevation taken on the line 7—7 of FIGURES 2 and 2a.

FIGURE 8 is a top plan section taken on line 8—8 of FIGURE 3, and 8—8 of FIGURE 2a.

FIGURE 10, partial section of the valve mechanism of the "constant depth" control, taken on the line 10—10 of FIGURE 2a.

Describing in illustration, but not in limitation and referring to the drawings:

Activity in underwater diving has increased greatly, especially as a sport, in military operation, in exploration and research, and in industry.

A diver entering the water with such scuba equipment, and any additional accessories such as a protective suit, swim flippers, and face mask, finds that he has a positive buoyancy, or in effect he is subjected to a vertically upward force by the water, since the weight of the scuba equipment underwater, including the weight of the initial charge of supply air under pressure is less than the weight of water it displaces.

In order to compensate for this positive buoyancy and allow a diver to achieve a state of weightlessness at the surface, or in effect a zero buoyancy at the surface, it is necessary, and it is the practice in the prior art, to apply weights, of for instance lead. As an example, a diver wearing conventional prior art scuba equipment, weighing 150 pounds, could apply from 14 pounds of lead weight in fresh water to 16 pounds of lead weight in salt water. However, this may vary greatly with different individuals depending on the buoyancy characteristics of the individual himself. One could have, for instance, a 150 pound man who could utilize or need only seven to ten pounds of weight. The amount of weight is arrived at by each individual empirically, that is by a trial and error method, wherein a diver immerges into the water and applies various weights until he secures a feeling of weightlessness.

However, the net buoyancy of a diver will subsequently vary from the time he initially submerges, depending on the time he is in the water, and the depth at which he operates.

The length of time a diver is in the water contributes to his buoyancy change, since he is constantly using the air which has the air supply in his main supply tank. A diver will increase in buoyancy in an amount equal to the weight of the air consumed. The air in each tank initially weighs about five pounds, so that during the consumption of a tank of air, a diver's buoyancy will increase five pounds.

The variations in buoyancy due to depth are created from the compressive effect on the diver due to the increased water pressure achieved at a lower level. For instance, a 150 pound diver may experience as much as a two pound loss in buoyancy at a 33 foot depth from his buoyancy at the surface. As a diver descends below 33 foot level, he more rapidly loses his buoyancy from the increased water pressure on his body.

Efforts have been made to compensate for buoyancy variations encountered by scuba divers as for instance, set forth in United States Patent 3,161,028. Such efforts involve a ballast tank which is selectively flooded and emptied by releasing air from the tank, on one hand, to flood the compartment, and to introduce air from the main diving supply, on the other hand, to evacuate the water from the tank. Such embodiments have not met with success.

First, it was necessary for the diver to manually control the air inlet to the tank to compensate for buoyancy changes. Second, it was not possible to select a depth at which a diver could continuously, and automatically maintain a weightless state with zero buoyancy. Furthermore, it was necessary for the tank to be positioned vertically to achieve proper operation. Additionally, any failure of the device would result in a substantial negative or positive buoyancy which would either propel the wearer to the surface or force him to the bottom, with quite possible disastrous results, particularly from the phenomenon known as the bends.

Such efforts have been quite relatively crude and have not proved of practical use in diving.

The present invention solves not only many of the problems of the prior art devices, but additionally provides for automatically setting a buoyancy of the surrounding water at the desired level itself is used to precisely, accurately and reliably set the diver buoyancy. Additionally the diver can easily and reliably control or achieve any desired degree of positive or negative buoyancy with no physical effort other than actuation of the control, and utilize the air from the main supply tank itself to achieve any degree of positive or negative buoyancy to ascend or descend. Thus, all his energy can be utilized for horizontal propulsion in the water, the ascending and descending being achieved with his main air supply.

In the operation of the present invention, a diver immediately prior to entering the water, depresses an "up" valve control button on the device to permit regulated air pressure to pass from the main air supply to displacement chambers, in the form of bladders or pistons within cylinders, so that when he initially enters the water he will float or have a positive buoyancy. When the diver is ready to descend, he actuates a "down" valve control button, which releases the air pressure from the displacement chambers. This action eventually gives the diver a negative buoyancy, or a downward force, in the water, which results from his initial overweight, achieved from the weight of the buoyancy unit itself including the housing an internal mechanism, or by wearing a lead weight belt.

The diver, as he descends, can sense the slightest change in his positive or negative buoyancy (for instance, even the buoyancy effect from breathing wherein lungs are filled and then expelled can be sensed by a diver). As the diver begins to descend he uses the "up" and "down" control buttons selectively to adjust the rate of speed of the descent. These controls feed air to the displacement chambers if the diver is descending too fast, or would like to stop at a certain depth, perhaps to release the trapped air pressure in his ears, or to adjust his SCUBA equipment, or to empty out any water in his face mask or for any other reason.

Once the diver reaches a desired depth, or the bottom, he sets and actuates his "constant depth" valve control button on the device, so that he is suspended in a weightless state at his selected depth. Under "constant depth" control, the diver's variation in buoyancy due to the consumption of his main air supply, and due to the effect of the water depth on his body, is compensated for by the automatic means, so that his net buoyancy at the selected depth remains zero.

The diver can subsequently change depths actuating the appropriate control buttons.

Figure 1:
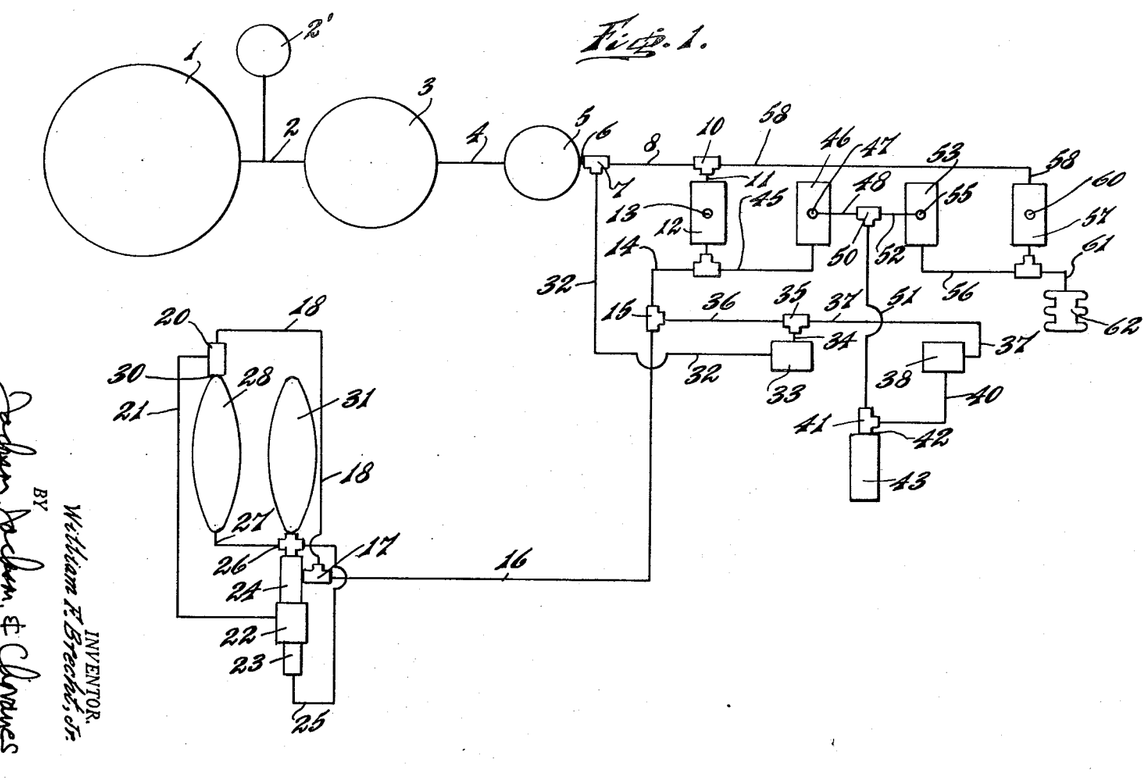
FIGURE 1 is a schematic diagram of the device of the invention.

Referring to FIGURE 1 and the schematic diagram shown therein, a source of pressurized air in a scuba tank 1, of a conventional type, connects through line 2 to a pressure reducer or single stage air regulator 3. A gauge 2′ indicates the pressure in line 2. From regulator 3, it connects through tubing 4 to low pressure single stage air regulator 5.

Regulators 3 and 5 reduce the pressure in two stages in a well known manner from, for instance, a scuba tank pressure of 2200 pounds per square inch to a first stage of 125 pounds per square inch to a final stage regulated by the outside water pressure, and can be from 0 to 125 pounds square inch gauge. The air at its final stage of pressure passes through line 6 to T-fitting 7. The air pressure at the outlet of the second stage regulator 5 is controlled by the outside water pressure. Line 8 connects from one outlet of T-fitting 7 to T-fitting 10. Line 11 connects from T-fitting 10 into two-way valve 12. Two-way valve 12 is operated by "up" push button 13. Line 14 leads from two-way valve 12 through T-fitting 15 through line 16 to T-fitting 17. Outlet 18 leads from T-fitting 17 into three-way valve 20. Outlet 21 from three-way valve 20 leads to air pilot actuator 22, having two-way valve 23 on one outlet of the actuator and two-way valve 24 on the other outlet of the actuator. Line 25 leads from the two-way valve 23 to four-way fitting or a cross-fitting 26 having outlet 27 which connects with air bladder 28. Bladder 28 abuts against three-way valve 20 which is pressure sensitive to pressure within the bladder, whereby the bladder is forced against valve 20 and a pressure sensitive switch 30 on 20 when bladder 28 is inflated.

One of the outlets from four-way fitting 26 connects with a pressure bladder 31.

Coming from three-way fitting, or T, 7 is line 32 which connects with two-way valve 33 which has an outlet 34 to T-fitting 35. Line 36 connects to an outlet on fitting 35. Line 37 is connected to an outlet on fitting 35 at one end and connects at the other end to two-way valve 38. Outlet 40 from two-way valve 38 connects into three-way fittings 41 which has one outlet connected at 42 to check valve 43.

An outlet line 45 connects from the outlet of two-way valve 12 to two-way valve 46 which is controlled by "down" push button 47. Outlet 48 from two-way valve 46 connects with T-fitting 50. Line 51 connects three-way fitting 50 to three-way fitting 41. Outlet 52 from fitting 50 connects with two-way valve 53 controlled by "exhaust" push button 55. Outlet 56 from two-way valve 53 connects with two-way valve 57. Also, line 58 from fitting 10 connects to an outlet on two-way valve 57. "Constant depth" push button 60 controls two-way valve 57. Outlet 61 from two-way valve 57 connects with metal bellows 62.

FIGURE 1 shows the pneumatic or air circuit of the invention. Valves 33 and 38 are operated by a mechanical balancing system best seen in FIGURES 2, 2a and FIGURE 3.

Figure 8:
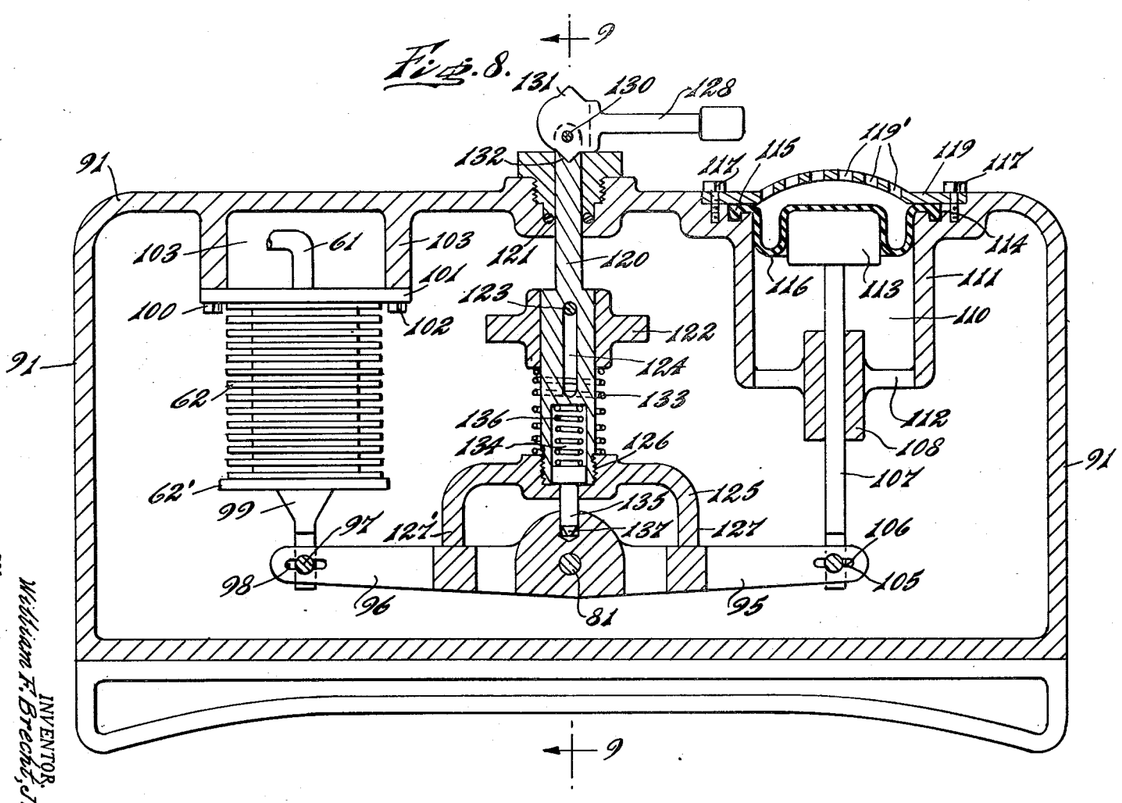
Figure 10:
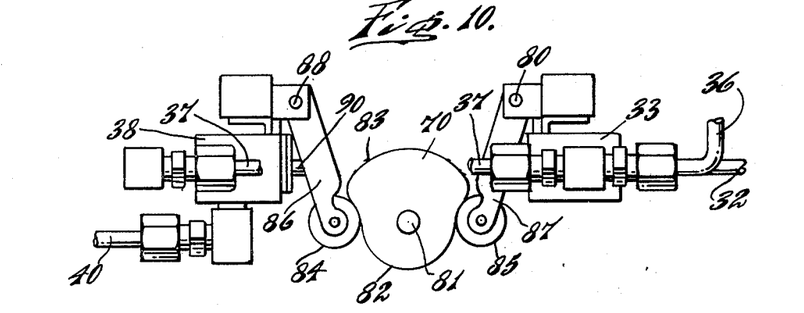

Valves 33 and 38, when the device is in constant depth operation, are controlled by a mechanical means as best seen in FIGURES 8 and 10. A cam 70 keyed on shaft 81 has a cam surface with a reduced curvature 82 and an increased diameter curvature 83. The cam surfaces 82 and 83 contact followers 84 and 85 respectively which are rotatively journaled on arms 86 and 87 respectively, which are fixedly pivoted on pivots 80 and 88. Arm 86 abuts against valve stem 90 and arm 87 abuts against a similar stem on valve 34, the stem not being shown in FIGURE 10. As cam 70 rotates, followers 84 and 85 will be selectively actuated to depress, or allow to extend, valve stem 90 on valve 38 and the valve stem on valve 33, thus controlling the passage of air through these valves. It will be seen that the cam 70 is patterned so that when one of the stems is depressed to allow increased air pressure and air passage through its related valve, the other of the valve stems will remain extended, thus keeping its related valve closed to any passage of air.

Figure 9:
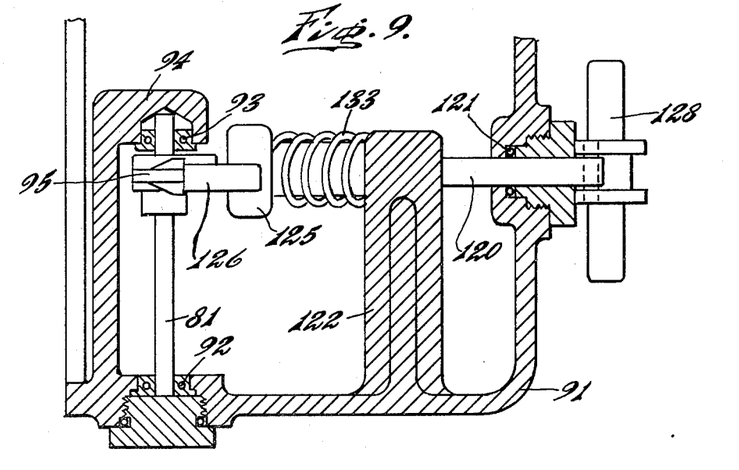
FIGURE 9 is a section of the stop mechanism on the "constant depth" control taken on line 9—9 of FIGURE 8.

Shaft 81, on which 70 is keyed is journaled within a housing 91 at 94. Housing 91 is suitably of a light cast metal and is roughly in the form of a rectangular box-like structure, and is suitably sealed to provide an airtight interior. A contoured bearing surface at 91' may be provided to conform to the diver, upon which the unit is fastened as by straps or quick release spring clips. Shaft 81 is journaled at one end in bearings 92 and at the other end in bearings 93 supported within housing 91 at 94 as best seen in FIGURES 2a and 9. Also, keyed on shaft 81 is a beam balance or rocker arm 95 as best seen in FIGURES 2a, 8 and 9. Rocker arm 95 has an extension 96 which pivotally connects at 97 through slot arrangement 98 with bellows extension 99 of bellows 62 which is secured at one end 100 by means of plate 101 and bolt 102 which are threaded into housing extensions 103 from housing 91. Plate 101 has an orifice therein connecting the interior of the bellows 62 with line 61.

Rocker arm 95 connects at 105 through slot and pivot arrangement 106 to piston shaft 107 which is slidably journaled in boss 108 of housing 91 which is formed in chamber 110 by housing walls 111. Vent holes 112 allow the pressure within the chamber 110 to equal that within the housing 91.

A piston 113 is fixed on the end of sliding shaft 107 and is substantially less in diameter than that of chamber 110. A flexible rolling diaphragm seal 114 is anchored at 115 in the housing and extends across piston 113 with an excess roll of the seal at 116 extending between the piston 113 and the chamber walls 111. This type of diaphragm is frictionless and permits travel of the piston longitudinally within the chamber 110. An inlet plate 119 with apertures 119' to permit passage of water through the plate is secured to the housing by bolts 117. The areas and volumes involved in the bellows 62 and the piston 113 and chamber 110 arrangement just described are calculated in a proper proportion as will be later shown.

The rocker arm 95 is locked in an inoperative position by means of the shaft 120. Shaft 120 extends through housing 91 through an O-ring seal 121 and a bracket 122 which extends from the housing and which acts as a bushing for the movement of the shaft. Bracket 122 holds a pin 123 which extends into an elongated hole 124 in shaft 120. The function of the pin 123 is to lock the shaft against rotation within the bushing, but allowing longitudinal movement of the shaft. A yoke 125 is threadedly fixed on shaft 120 at 126, the yoke having arms 127 and 127'. The arms 127 and 127' come into bearing relationship with the rocker arm 95 as the shaft is moved inwardly into the housing 91 under the influence of a lever arm 128 which is pivoted to shaft 120 at 130. Arm 128 has cam points 131 and 132 which can be selectively engaged with an abutment on the housing 91 to allow the shaft 120 to move inwardly or to retract the shaft 120 outwardly against a bias of helical compression spring 133 which is abutted between housing bracket 122 and the yoke 125. Extending within the shaft 120 within a bore 134, is a spring loaded pin 135 which is biased outwardly under the influence of helical compression springs 136. Pin 135 has a point 137 thereon. Cam point 132 is the low side at which time the yoke will lock the rocker arm, and point 131 is the high side which if engaged with the housing retracts the yoke from engagement from the rocker arm and allows the rocker arm to move as will be described.

Figure 4:
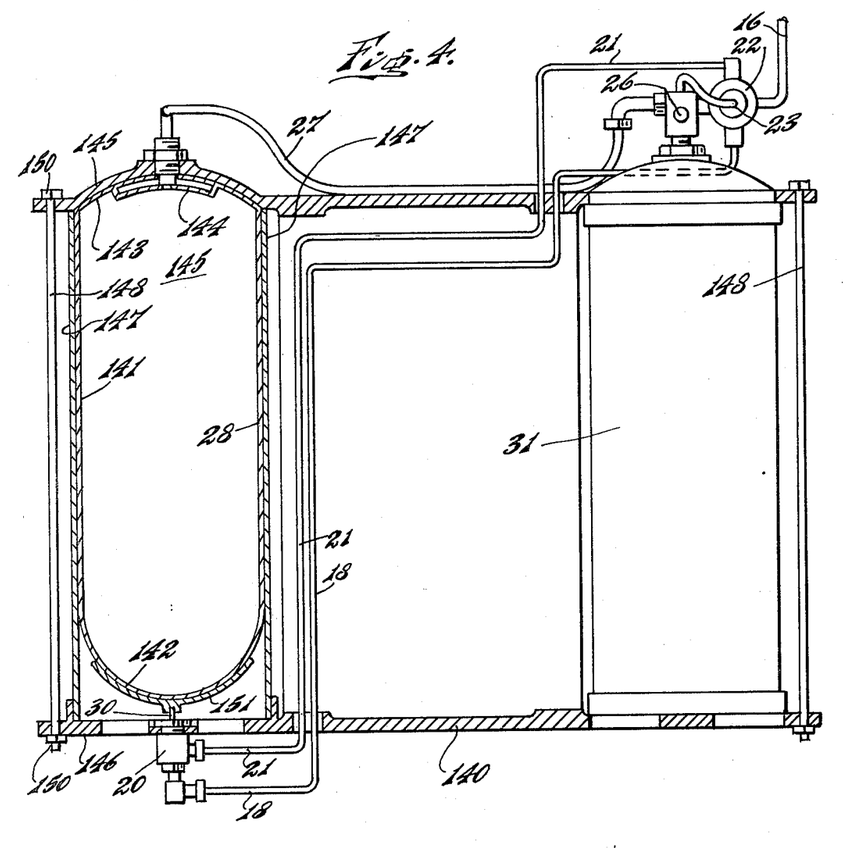
FIGURE 4 is a sectional elevation showing the displacement chamber and mounting, with one of the chambers in section, the chambers being shown mounted on a scuba air tank.

Bladder 28 is supported in a mounting structure 140 as best seen in FIGURE 4, which may be attached to the scuba air tank, or to the diver directly. The bladder 28, which is of a flexible material such as rubber, or a suitable plastic, has cylindrical walls 141, a bottom portion 142, and a top mounting portion 143, along with a flexible sealing portion 144. The bladder is held within a rigid mounting structure 140 comprising a top dome portion 145, which may be permissible of stiff plastic or light metal, and a bottom base portion 146. Stiff support walls 147 extend between the top and bottom sections 145 and 146 and are held securely therein by tie rods 148 having securing nuts 150 at the end thereof. A pronged dome-like fitting 151 extends around the bottom flexible portion 142 of the bladder and is integrally fixed to the extending stem of the pressure sensitive switch 30, so that a substantial portion of the bladder exerts the air pressure within the bladder against the fitting 151 which in turn is transmitted to the valve 30.

It should be noted that although the present invention shows bladders as displacement chambers, the bladders may be replaced by a piston and cylinder arrangement to obtain a displacement effect. In either construction a material separator extends between the air and water.

The displacement chambers and mounting 140 may be fastened to the scuba divers air tank by means of a circular clamp 155, having a locking lever 156. The mounting unit 140 has lower back contoured bearing plate 157 and upper back bearing plate 158. Straps surrounding the diver's body are secured to plates 157 and 158.

Suitable weights, such as lead bars, may be added to the back pack unit shown in FIGURE 4 to achieve a balancing effect. These lead weights may be attached by any suitable means.

Figure 2:
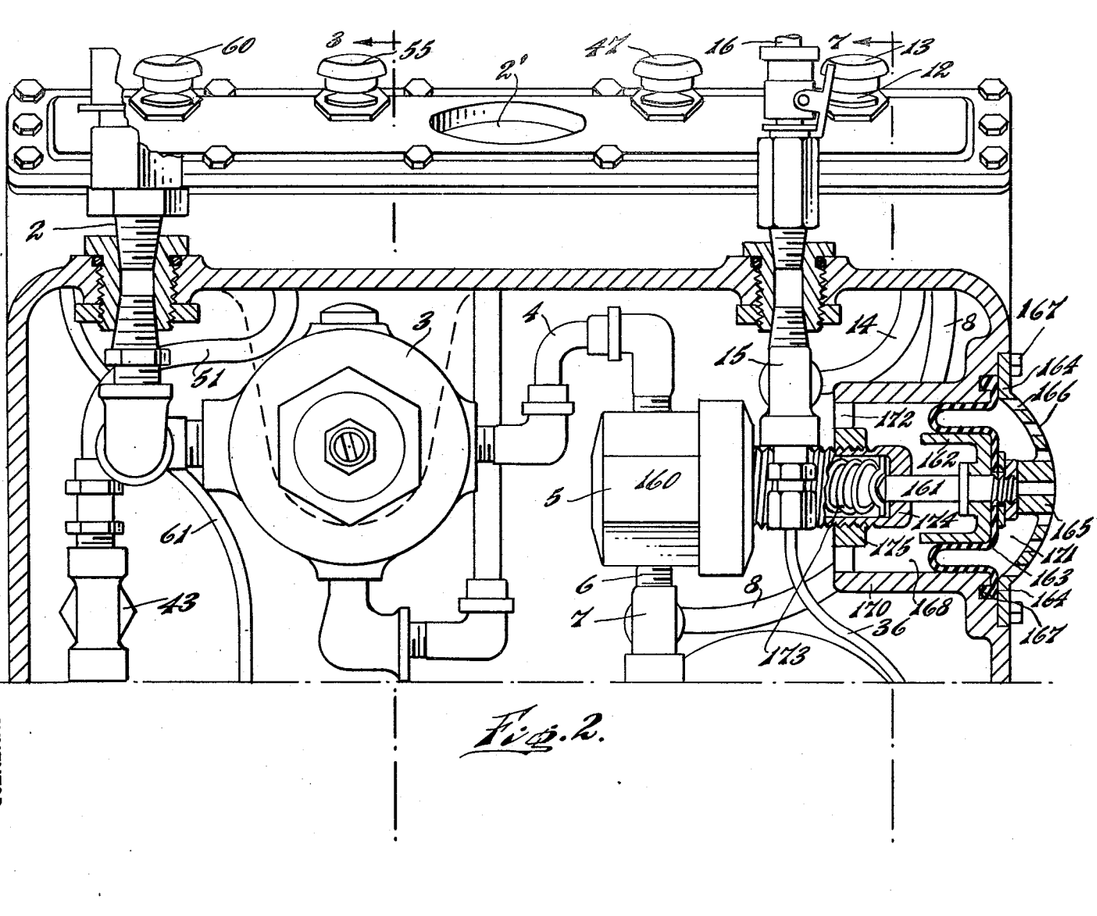
FIGURE 2 is a back vertical section of the upper portion of the control unit of the invention.
Figure 2A:
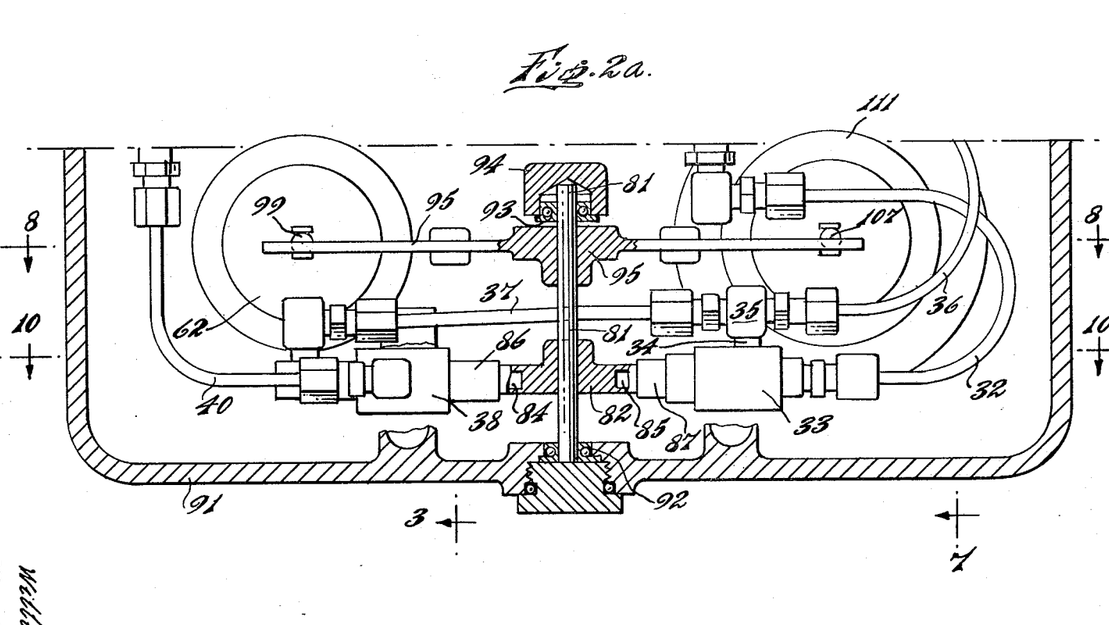
FIGURE 2a is a continuation of FIGURE 2, showing the lower portion of the control unit.
Figure 3:
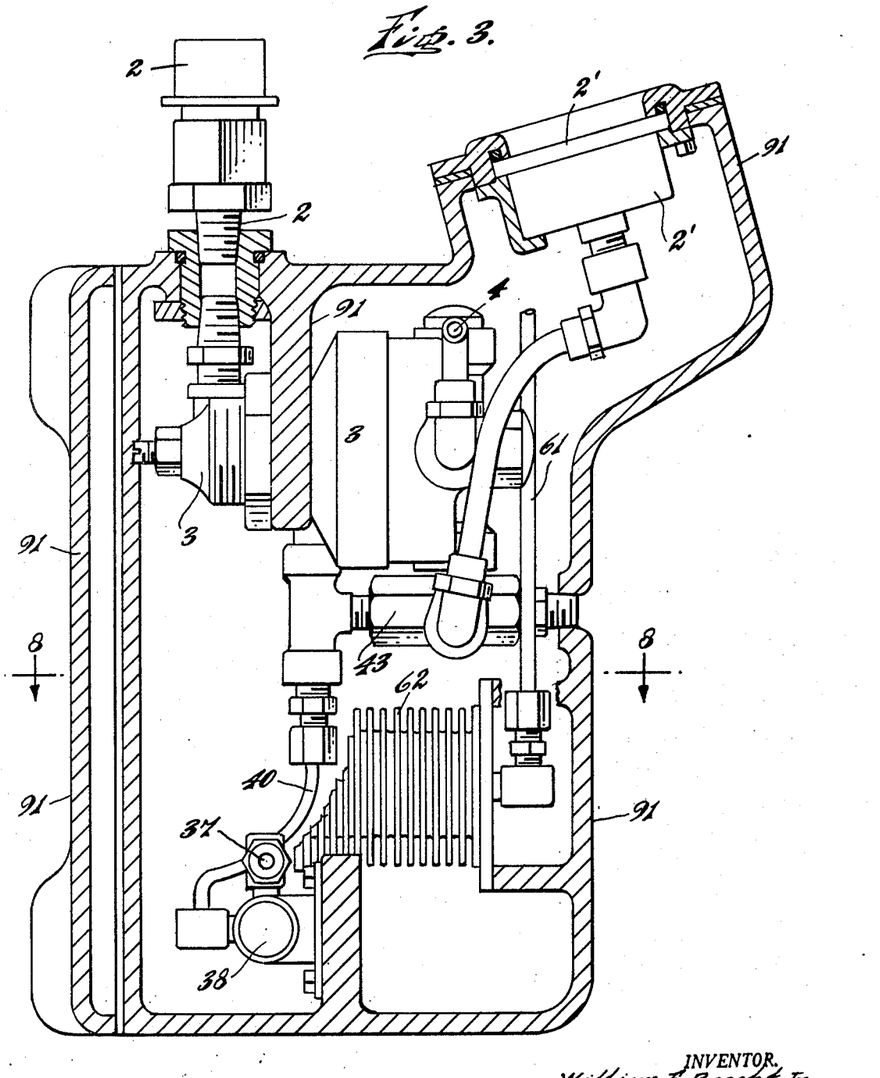
FIGURE 3 is right side sectional elevation of the control unit shown in FIGURES 2 and 2a taken on line 3—3.

Regulator 5 is of a conventional type in its internal construction, having a body or housing seen in FIGURE 2 and has extending therefrom a regulator shaft 161 which moves longitudinally within the body 160 and controls a valve therein which opens and closes between intake line 4 and discharge line 6, in order to achieve the desired pressure. Shaft 161 is connected to piston 162 which has secured thereon rolling diaphragm 163 which is sealed in the housing at 164. A cover plate 165 having passages 166 is secured to housing 91 by bolts 167. Plate 165 retains rolling diaphragm 163 in the housing at suitable anchorages under bolts 167. The piston 162 and diaphragm 163 operate to separate air pressure within chamber 168 created by walls 170 from the water pressure entering through passages 166 into space 171. Air pressure from within the housing passes into chamber 168 through passage holes 172. Regulator 5 includes helical compression spring 173 and threaded cap follower 174 which is screwed into the housing 91 at boss 175.

Figure 5:
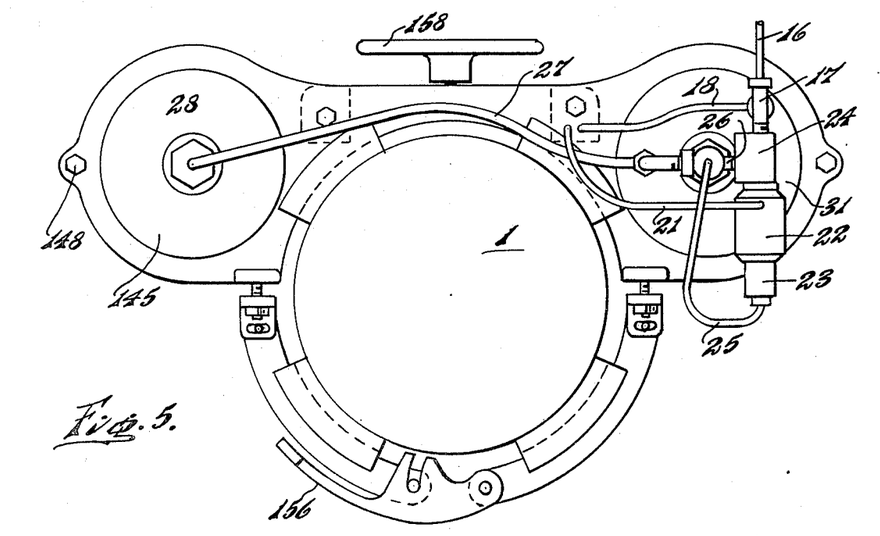
FIGURE 5 is a top view of the displacement chambers and mounting.
Figure 6:
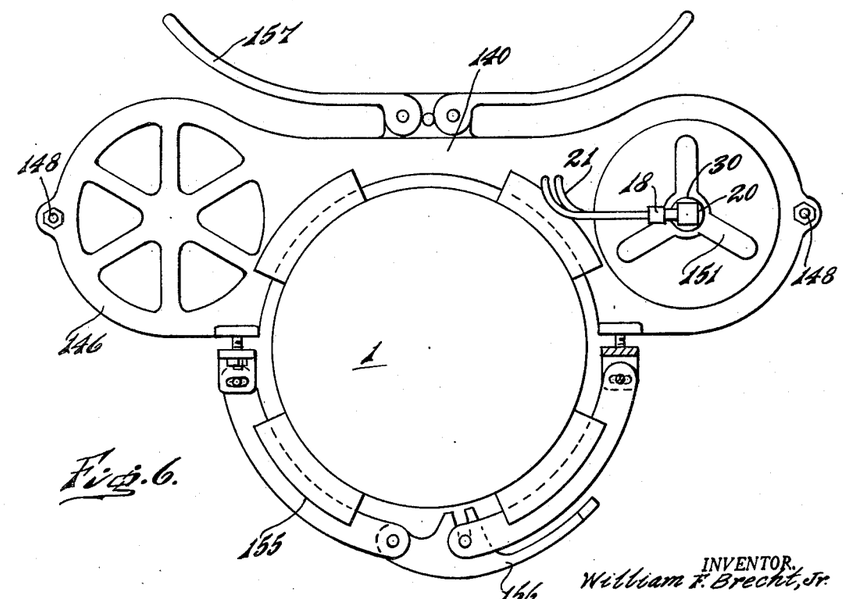
FIGURE 6 is a bottom plan view of the arrangement shown in FIGURE 5.
Figure 7:
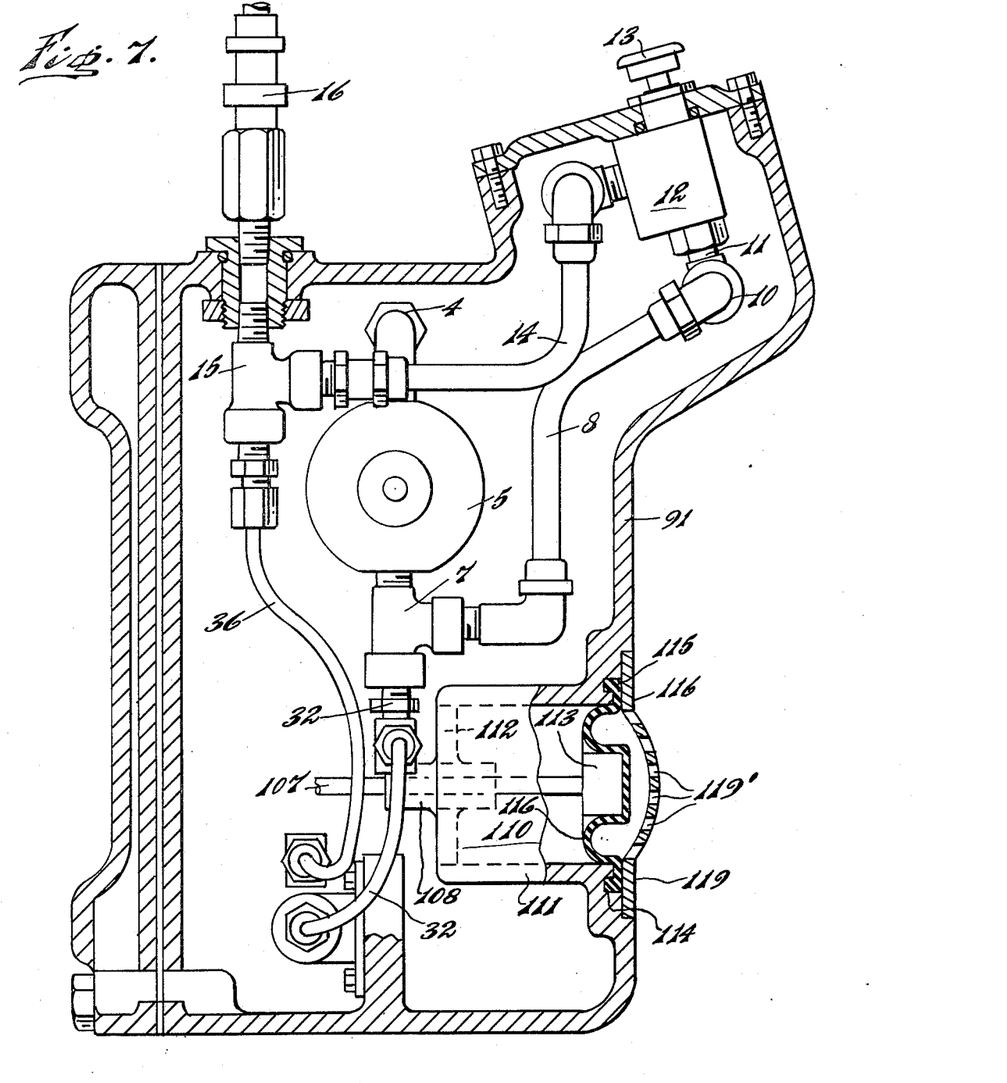

In operation, the apparatus of the present invention is secured to the scuba diver prior to his entry into the water. Displacement chambers and mounting 141 are fastened to the diver's air supply tank or to the diver directly, by suitable fastenings. Where connected to the supply tank, the clamp structure shown in FIGURES 5 and 6 is used. The control unit as seen in FIGURES 2 and 2a, and other related figures, is secured to the diver's chest by straps, or spring clips. Flexible air line 2 from the tank 1 to the control unit, and flexible air line 16 from the control unit to the displacement chambers, are connected, suitable high pressure quick disconnect couplers, of a convention type, are used.

The diver, immediately prior to entering the water, depresses the "up" push button 13, opening two-way valve 12, thus allowing air to pass through lines 8, 11, 14 and 16, through normally open valve 24, into bladders 28 and 31. Button 13 is held depressed until the bladders are filled and the air feed is shut off as will later be explained.

In the alternative, the diver can release the "up" button 13 prior to full bladder capacity, if he feels he has enough air to give him a positive buoyancy when he enters the water.

Regulator 5 is set to provide a pressure at the outlet slightly in excess of the surrounding water pressure, and it is this pressure which enters line 8, and eventually the bladders 28 and 31.

The diver then enters the water and senses his buoyancy as he immerses. He will normally have a floating or positive buoyancy effect from the displacement of his equipment, and the effect of the displacement chambers.

When he decides to descend, by achieving a negative buoyancy, or a downward force, independent of any of his own efforts of swimming, he depresses the "down" push button 47. When push bottom 47 is depressed, two-way valve 46 opens, permitting air from the displacement bladders 28 and 31 to exit through lines 27, 16, 14, 45, through valve 46, through lines 48 and 51 and out check valve 43, which permits flow only in one direction, to the surrounding environment into the outside body of water. It should be noted that air continues to exhaust to the surrounding body of water from bladders 28 and 31 during the period when "down" push button 47 is depressed. The water pressure from the surrounding water bears on the bladders, forcing the air through the open discharge lines. The diver continues to exhaust air from the bladers until he sense his descent which is a result of his negative buoyancy.

It should be understood that he has an overweight negative buoyancy, initially, as described above, from the weight of the apparatus itself, and any additional lead weights which may be utilized by the diver in the form of a weight belt or in the form of lead weights attached to the apparatus. The bladders when fully inflated cause the apparatus of the invention to have a considerable positive buoyancy effect, and it is within these limits of positive and negative buoyancy that the apparatus operates.

As the bladders continue to deflate, the apparatus will lose positive buoyancy and eventually achieve negative buoyancy, driving or forcing the diver to descend. The diver senses his rate of descent, and when he achieves the desirable rate of descent he releases the "down" push button 47, closing off the exhaust of air from the bladders 28 and 31.

The diver may desire to make stops on his descent or slow his rate of speed of descent, for instance, for clearing his ears of air pressure, clearing the face mask of water, adjusting his equipment, or any other desirable reason. He achieves this stopping or deceleration of descent by pushing "up" button 13, thus allowing air to enter into the bladders and decreasing his negative buoyancy. Thus, by the use of the "up" and "down" push buttons selectively he can inflate or deflate the bladders, thus governing his rate of descent.

When the diver reaches a water depth at which he desires to attain a state of weightlessness, or when he reaches the bottom and also desires to achieve a state of weightlessness, he depresses the "constant depth" push button 60. By a state of weightlessness, it is meant that condition of a diver wherein he has neither a positive buoyancy upward, that is, a tendency to rise, or a negative buoyancy which is a force causing him to descend. At zero buoyancy, or weightlessness, the factors contributing to the forces from gravity due to his body weight and equipment weight are exactly equal to the upward forces exerted by the displacement of water by the diver and his overall equipment. In a state of weightlessness, the diver can devote his full energies to horizontal travel with no effort extended to fight a downward force or an upward force to maintain a constant level.

When the "constant depth" push button 60 is depressed, air from regulator 5 is admitted through lines 8 and 58 permitting pressure from line 58 to enter bellows 62 through line 61.

Single stage regulator 5 has an air pressure output controlled by the outside water pressure at the depth at which the apparatus of the invention is operating. This water pressure is transmitted through apertures 166 in plate 165 to rolling diaphragm 163 to piston 162 to connecting rod 161 and into the regulator body 160. Diaphragm 163 is secured at 164 under bolts 167 over chamber 168. Conventional regulator 5 is set so that a minimum of 5 pounds pressure gauge always is fed from the regulator, though the biasing action of spring 173 whose compression can be adjusted with threaded follower 174.

With "constant depth" push button 60 depressed, valve 57 is open and air under the pressure from regulator 5 goes into bellows 62. The diver then releases push button 60 and valve 57 closes. Bellows 62 has an internal pressure at this point which is at the setting of regulator 5, which is slightly in excess of the water pressure at the depth at which push button 60 is actuated. After depressing and releasing push button 60, the diver rotates level arm 128 so that point 131 comes into engagement with the housing, and shaft 120 is pulled out of engagement with rocker arm 95. Also yoke 125, with arms 127 and 127', are withdrawn from locking engagement with arm 95, and the rocker arm is now free to rotate on shaft 81. The mechanism is shown in FIGURE 8 and FIGURE 9.

Rocker arm 95 is now under the balancing effect of the internal pressure within bellows 62, on one hand, and the external pressure of the water at the level at which the apparatus is positioned. Water pressure enters through plate 119, through apertures therein 119', and is exerted, through rolling seal 116, against piston 113. Connecting rod 107 transmits the force exerted against piston 113 to one arm of the rocker arm. The area of the internal chamber 110 is calculated to equal the cross sectional area of the in plate 62' of bellows 62 against which the pressure within the bellows is exerted. In effect the areas of the bellows plate at 62' and the area of the chamber 110 are calculated so that force exerted against the rocker arm at the pivots 97 and 105 respectively would be equal, if the pressure in the bellows and the water pressure externally are equal. Hence, in the device of the invention, air pressure is created within the bellows initially at a set level, and rocker arm 95 will maintain a neutral position as long as the surrounding water pressure at which the unit is disposed in equal to the pressure in the bellows. Should the water pressure exerted on diaphram 116 exceed the pressure locked within the bellows, rocker arm 95 as viewed in FIGURE 8 will rotate clockwise, thus causing shaft 81 in FIGURE 10 to likewise rotate clockwise. This will cause extended cam surface 83 to depress follower 85 causing arm 87 to depress the valve stem of valve 34 permitting air to enter through line 36 from line 32 into line 16 and into the bladders 28 and 31. The bladders 28 and 31 will continue to expand, thus displacing water within the mechanism of the invention. This will eventually increase the positive buoyancy causing the diver and apparatus to rise or ascend.

As the diver rises, the water pressure exerted against diaphram 116 within chamber 110 will decrease and the force exerted against piston 113 and rocker arm 95 at 105 will also decrease, eventually causing rocker arm 95 to rotate counterclockwise as seen in FIGURE 8. Thus causing shaft 81 likewise to rotate counterclockwise in FIGURE 10 until cam surface 83 rotates out of contact with follower 85 and follower 85 comes into contact with cam surface 82, thus permitting arm 87 to rotate and allow the valve stem on valve 34 to extend to allow valve 34 to close, thus closing the feed of air into bladders 28 and 31. Thus, the diver is maintained at his preset selected water depth.

In the event that the diver ascends from his desired level, the water pressure will decrease, thus allowing rocker arm 95 to rotate counterclockwise as seen in FIGURE 8. This will cause shaft 81 to rotate counterclockwise as seen in FIGURE 10 causing cam surface 83 to depress follower 84 causing arm 86 to depress valve stem 90 thus causing valve 38 to open, permitting air under pressure from line 37 to discharge through check valve 43 into the surrounding body of water. The air passes through 37 from line 36 which exhausts line 16 connected to bladders 28 and 31.

As air is discharged or exhausted from bladders 28 and 31, the buoyancy effect of the apparatus is directed toward the negative and there is eventually a downward force exerted against the apparatus and the diver. The diver will then descend until the water pressure at the descending depth balances out the outer arm 95 to rotate cam 70 to close valve 38, thus stopping the release of air from the bladders. Thus, the diver is kept at a constant level regardless of whether he temporarily descends or ascends from his level. In the event that the diver acquires added weight, for instance from tools or lifting an outside object, he would temporarily descend but through the mechanism explained above, the apparatus would compensate and he would again ascend to a state of weightlessness at his selected level. On the other hand, should he lose weight, or should his buoyancy change, as for instance from his continued use of his air supply, the apparatus would again compensate.

When the diver desires to go off his constant depth setting and no longer desires to remain in a state of weightlessness at a given level, he rotates lever 128 into the position shown in FIGURE 8 so that a point 132 engages the notch on the housing and shaft 120 moves longitudinally into the housing so that yoke 125 moves into engagement against rocker arm 195. If rocker arm 95 is not balanced, either arm 127 or arm 127' will first contact the rocker arm and force it toward a balanced or neutral position as shown in FIGURE 8. During this time, the point 137 on 135 will engage against the outside curved surface of the rocker arm and will be retracted or forced within the shaft 120 at bore 134 against the influence of spring 136. When the arms 127 and 127' force the rocker arm 95 into a neutral or balanced position, rocker pin 135 will spring forward under the influence of compression spring 136 and seat pin 135 under the guiding influence of 137 into the recess in the rocker arm 95 as shown in FIGURE 8. This locks the rocker arm 95 against any rotation. At this position, valve 34 and 38 are closed, shutting off discharge or feed into the bladders. Exhaust push button 55 is then pushed to open valve 53 permitting air to be drained or discharged from within bellows 62 through line 61 into line 56 through line 51 and out check valve 43 to the surround body of water. The push button 55 is then released permitting bellows 62 to be ready for a new setting.

Depending on whether the diver then wants to ascend or descend, he will push the appropriate push button, "up" push button 13 or "down" push button 37 as described above.

The bladders are safeguarded against rupture from excessive pressure by the safety arrangement which utilizes switch 20. Additionally, the valve 20 permits a more efficient utilization of the air since it does not permit air into the bladders beyond a certain pressure, beyond which no further displacement effect could be achieved.

When the pressure in bladder 28 exerts a predetermined amount as controlled by the setting of push switch 30 on valve 20, the bladder at 142 forces the push stem downward or open as seen in FIGURE 4. As viewed in FIGURES 1 and 4, open valve 20 then permits air to pass from inlet 18 which is connected to main feed line 16, through to line 21. Air then passes from line 21 into actuator or air switch 22 which in turn closes valve 24, while at the same time opening two-way valve 23. When valve 24 shuts off, it closes off all input air from line 16 through to bladders 31 and 28. When two-way valve 23 opens, it bleeds bladders 28 and 31 through line 25 and then exhausts the air through to the surrounding body of water, thus decreasing pressure within bladders 28 and 31, and against stem 30. When sufficient force is relieved from switch stem 30, valve 20 goes to a closed position, while at the same time a bleeder opening within valve 20 opens, bleeding trapped air in line 21 and actuator 22, thus allowing actuator 22 to move to open valve 24 and close valve 23.

Having thus described my invention, what I claim as new and desire to secure by Letters Patent is:

1. A buoyancy control device for underwater diving in a body of water comprising in combination:
   (a) an air supply;
   (b) a displacement chamber, for displacing water, and containing therein air, connected to the air supply, said displacement chamber
      (1) being exposed to the water, and
      (2) having movable walls to vary the volume of water displaced;
   (c) valve means for controlling the flow of air from the air supply to the displacement chamber to provide a diver with positive buoyancy;
   (d) valve means for controlling the exhaust of air from the displacement chamber to provide a diver with negative buoyancy;
   (e) and means for controlling the feed of air to the displacement chamber, and the exhaust from the displacement chamber, responsive to the water pressure at the water depth at which the device is operating, to provide a diver with zero buoyancy at a given water depth selected by the diver.

2. A device of claim 6 wherein the means for controlling air feed to, and air exhaust from, the displacement chamber to provide zero buoyancy for the diver at a selected level, comprises:
   (a) a sealed source of air at a pressure which depends on the water pressure at the selected level,
   (b) means for determining the water pressure at the level at which the device is positioned under water,
(c) means for comparing the sealed source of air at a pressure which depends on the water pressure at the selected level, and the water pressure at the level at which the device is positioned under water,
(d) and means for using the comparison for selectively feeding air and selectively discharging air from the displacement chamber.

3. A device of claim 2, in which a regulator is used in providing a sealed source of air at a pressure which depends on the water pressure at the selected level.

4. A device of claim 1 wherein the displacement chamber comprises a bladder having expandible walls to change the volume capacity of displacement.

5. A device of claim 1 wherein the displacement chamber comprises a piston and cylinder.

6. A device of claim 1 wherein the displacement chamber has a material separator between the air and water.

7. A device of claim 1 in combination with means for stopping the feed of air to the displacement chamber responsive to the pressure of air within the chamber.

8. A method for an underwater diver to achieve a state of weightlessness at a given selected depth in a body of water comprising:
(a) providing a source of air at a pressure dependent upon the water pressure at the given selected depth,
(b) comparing the pressure of the air with the pressure of the water at which the diver is positioned,
(c) and using the comparison to increase the diver's buoyancy by means of a displacement chamber exposed to the water and having movable walls, by feeding air to the displacement chamber to expand the chamber, or exhausting air from the displacement chamber to contract the chamber, thereby increasing or decreasing the amount of water displaced by the chamber, thereby increasing or decreasing the positive or negative buoyancy of the diver.

References Cited

UNITED STATES PATENTS

| | | |
|---|---|---|
| 1,579,109 | 3/1926 | Haseley. |
| 2,361,949 | 11/1944 | Langdon. |
| 2,887,976 | 5/1959 | Hanna et al. |
| 3,161,028 | 12/1964 | Odum et al. ___________ 61—69 |
| 3,204,596 | 9/1965 | Fallon. |
| 3,379,156 | 4/1968 | Keays et al. _________ 61—69 X |

J. KARL BELL, Primary Examiner

U.S. Cl. X.R.

114—16